(12) United States Patent
Zhang et al.

(10) Patent No.: US 9,285,825 B1
(45) Date of Patent: Mar. 15, 2016

(54) REDUCING CAMERA MASTER CLOCK DESENSE

(71) Applicant: Amazon Technologies, Inc., Reno, NV (US)

(72) Inventors: Zhibin Zhang, Cupertino, CA (US); Amit Shailesh Gaikwad, Fremont, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 269 days.

(21) Appl. No.: 14/142,620

(22) Filed: Dec. 27, 2013

(51) Int. Cl.
*G06F 1/04* (2006.01)
*G06F 1/08* (2006.01)

(52) U.S. Cl.
CPC ... *G06F 1/04* (2013.01); *G06F 1/08* (2013.01)

(58) Field of Classification Search
CPC ..................................... G06F 1/04; G06F 1/08
See application file for complete search history.

(56) References Cited

U.S. PATENT DOCUMENTS

| | | | | |
|---|---|---|---|---|
| 7,181,239 B2* | 2/2007 | Yamamoto | ............. | H04B 15/02 348/376 |
| 7,818,030 B2* | 10/2010 | Kawamoto | ................ | G06F 1/06 455/553.1 |
| 8,306,524 B2* | 11/2012 | Jung | .......................... | G06F 1/08 375/345 |
| 8,565,709 B2* | 10/2013 | Mullins | ................ | H03H 7/0115 455/307 |
| 2007/0152765 A1* | 7/2007 | Chen | ...................... | H03B 28/00 331/74 |

* cited by examiner

*Primary Examiner* — Stefan Stoynov
(74) *Attorney, Agent, or Firm* — Seyfarth Shaw LLP; Ilan N. Barzilay

(57) ABSTRACT

Embodiments of the subject technology provide for controlling desense in a mobile computing device. At an application processor of a mobile computing device, a drive strength of an input clock signal is increased. The input clock signal with the increased drive strength is then provided to a filter circuit that performs low-pass filtering to block high frequency RF and EMI noise from the input clock signal. The filtered input clock signal is provided to respective camera clock units of a front-facing camera or a rear-facing camera of the mobile computing device for operating the front-facing and rear-facing cameras.

20 Claims, 6 Drawing Sheets

REDUCING CAMERA MASTER CLOCK DESENSE

BACKGROUND

Mobile computing devices have evolved to include more functionality. For instance, a mobile computing device (e.g., smartphone, phablet, tablet, etc.) may provide voice and data communications functionality, as well as computing, imaging, and processing capabilities. A mobile computing device may support cellular communication over a cellular network and data communication over a wireless radio channel, while providing image processing and capturing capabilities via one or more cameras provided by the mobile computing device.

BRIEF DESCRIPTION OF THE DRAWINGS

Various embodiments in accordance with the present disclosure will be described with reference to the drawings, in which.

DETAILED DESCRIPTION

Figure 1:
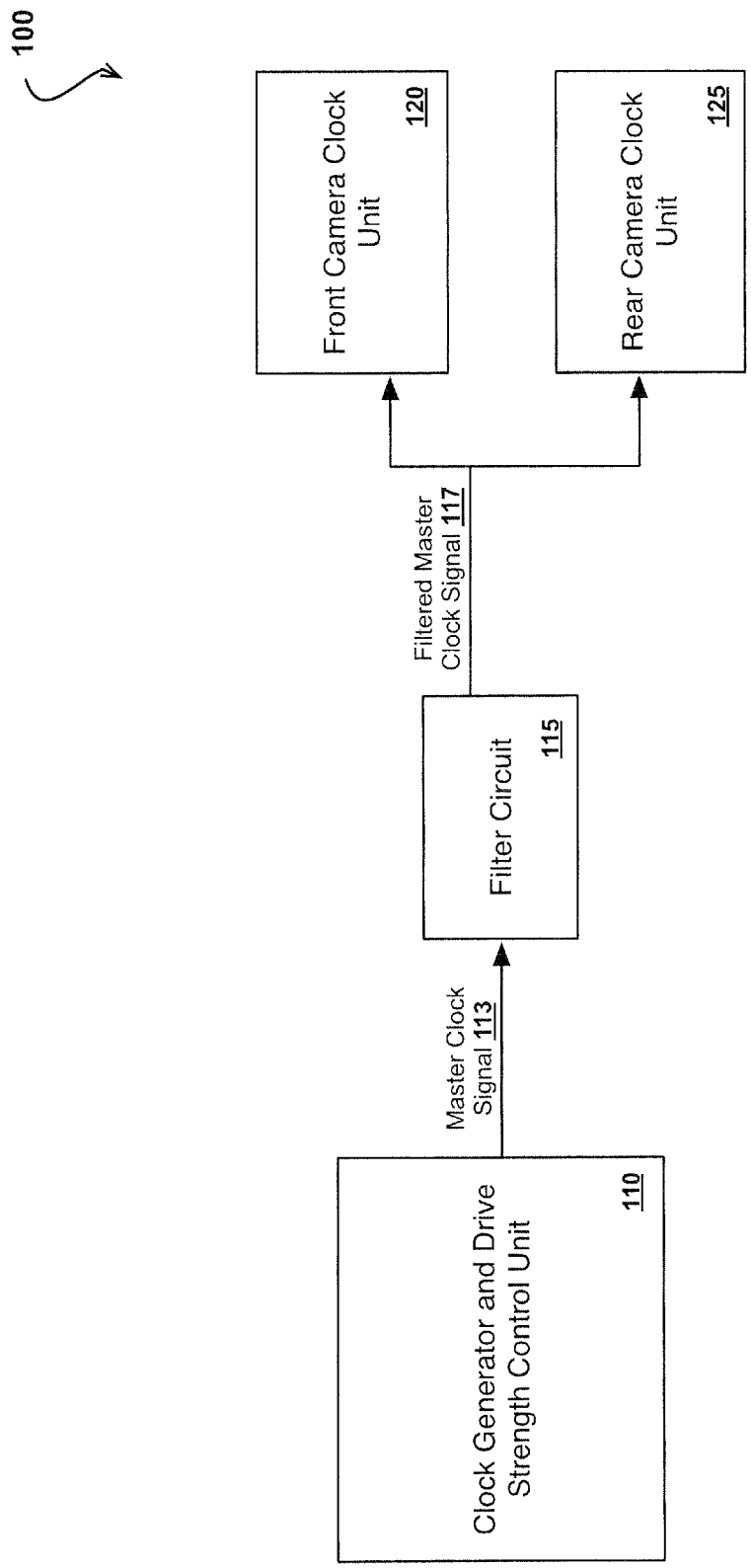
FIG. 1 conceptually illustrates an example apparatus for reducing desense caused by a clock signal.

Systems and methods in accordance with various embodiments of the subject technology may overcome one or more deficiencies experienced in existing approaches to reduce radio antenna desense in a mobile computing device.

Mobile computing devices are increasingly more complex and provide more functionality. A given mobile computing device may include radio circuitry for providing communications capabilities for the mobile computing device, such as supporting cellular voice communication and wireless data communication. Such radio circuitry may include a radio receiver for communicating with a cellular network at a respective frequency. Additionally, the mobile computing device may include camera circuitry to support front-facing and/or rear-facing cameras that provide image capture functionality.

In some cases, a clock signal generator may be included in a given mobile computing device to provide a clock signal. In some examples, a clock signal is a periodic waveform that provides timing references for controlling the activities of other circuitry in the mobile computing device. The clock signal generator may be designed to meet the drive or current requirements of circuitry in the mobile computing device. By way of example, a drive strength of a clock signal may be expressed in units of current, such as amps.

With an increasing number of circuits and an increasing complexity of such circuits included in a mobile computing device, electromagnetic interference (or EMI, also called radio-frequency interference or RFI when in radio frequency) may increase that degrades or limits the effective performance of a given circuit in the mobile computing device. EMI is generated by almost all types of electrical circuits.

In this regard, an area of concern for radio circuitry in the mobile computing device pertains to desense (e.g., degradation in sensitivity due to noise) of a radio receiver provided in the radio circuitry. Excessive desense may reduce receiver sensitivity and may cause the radio circuitry to drop communication links. In some examples, a master clock signal provided to one or more camera circuits in a mobile computing device is a source of EMI that significantly contributes to desense occurring in the radio circuitry and may produce interference with a baseband signal used by the radio circuitry for transmitting and receiving cellular communications. One typical approach for addressing desense in radio circuitry may therefore involve decreasing the drive strength of such a clock signal. However, a reduced drive strength may have undesired effects on circuits in a given mobile device. In some cases, functionality (e.g., camera) provided in a circuit may not function properly or effectively when the drive strength is too low. For instance, camera circuitry in the mobile computing device may not be able to capture images when the drive strength of the clock signal is too low.

Although a mobile computing device (e.g., a smart phone, an electronic book reader, or tablet computer) is mentioned, it should be understood that various other types of electronic devices that are capable of determining and processing input can be used in accordance with various embodiments discussed herein. These devices can include (but are not limited to), for example, notebook computers, personal data assistants, video gaming consoles or controllers, portable media players, and wearable computers (e.g., smart watches, smart glasses, etc.) among others.

The subject technology, in some embodiments, provides a novel approach to address desense among one or more components in a mobile computing device.

FIG. 1 conceptually illustrates an example apparatus 100 for reducing desense caused by a clock signal. As shown in FIG. 1, the apparatus 100 includes a clock generator and drive strength control unit 110, a filter circuit 115, a front camera clock unit 120, and a rear camera clock unit 125. The apparatus 100 may be included as part of a given computing device, such as a mobile computing device with a radio transmitter/receiver to provide cellular or wireless communications and at least one camera to capture and/or process image data. In some embodiments, the apparatus 100 shown in FIG. 1 may be utilized when a camera is in use concurrently with a radio frequency being received and/or transmitted.

In some embodiments, the clock generator and drive strength control unit 110 may be included as part of an application processor in a mobile computing device. The application processor, in some examples, may be a specialized processor or a System-on-a-Chip (SoC) designed for the processing and/or power requirements of the mobile computing device. In some embodiments, the clock generator and drive strength control unit 110 may include two clock drivers, connected in parallel, to increase the drive strength of a clock signal. In one example, a clock signal with a 2 mA current is passed into the two clock drivers to increase the drive strength of the clock signal. The clock signal may be utilized as a reference clock signal set at a low frequency. Each clock driver may include logic and/or other components (e.g., one or more transistors) for increasing the drive strength of the clock signal. In some embodiments, the drive strength of the clock signal refers to an amount of current that may be drawn or supplied. It should be appreciated that the drive strength of the clock signal may be increased according to the configuration of the clock driver(s) to a respective higher value of current. The clock generator and drive strength control unit 110 subsequently outputs a master clock signal 113 with an increased drive strength at a higher current (e.g., from 2 mA to 8 mA) to the filter circuit 115.

In some embodiments, the clock generator and drive strength control unit 110 includes a pad (power amplifier driver) structure that may be used to increase the drive strength of the clock signal. Additionally, in some embodiments, the clock generator and drive strength control unit 110 may further include one or more components that apply a pre-emphasis to the clock signal to provide overshoot and/or undershoot in order to boost certain frequencies of the clock signal that may be lost along a channel including one or more filters. By way of example, applying pre-emphasis to the clock signal may generate a wave-shaped signal in a time domain that is then fed into the pad structure to increase the drive strength of the wave-shaped signal (e.g., the clock signal with pre-emphasis). It is appreciated that other ways to increase the drive strength of the clock signal may be provided and still be within the scope of the subject technology.

The filter circuit 115 receives the clock signal and filters the clock signal to remove or attenuate frequencies above a certain threshold frequency (e.g., the filter cutoff frequency). In some embodiments, the filter circuit 115 is a pi filter or capacitor input filter (or a similar low-pass filter) that filters out high frequencies at a specified threshold frequency (e.g., the filter cutoff frequency). In some embodiments, the filter circuit 115 may be configured to perform low-pass filtering that attenuates a set of frequencies of the master clock signal 113 above a cutoff frequency by a decibel rejection amount (e.g., a negative value such as −3.0 dB, etc.) and at a rate of frequency roll-off (e.g., 20 dB per decade or 6 dB per octave, etc.) that pushes the cutoff frequency within a threshold amount of a fundamental frequency of the master clock signal 113. In some embodiments, at the cutoff frequency, the filter attenuates the input power of an input signal by half or 3 dB based on the decibel rejection amount (e.g., −3.0 dB). Roll-off in some examples refers to a rate at which attenuation increases beyond the cut-off frequency, and the rate of frequency roll-off may represent a function of a logarithmic frequency and the units of roll-off may be either decibels per decade (dB/decade), where a decade is a 10-times increase in frequency, or decibels per octave (dB/8ve), where an octave is 2-times increase in frequency.

The filter circuit 115 then outputs a filtered master clock signal 117 to the front camera clock unit 120 and rear camera clock unit 125. The front camera clock unit 120 or the rear camera clock unit 125 receives the filtered master clock signal. Each camera clock unit then utilizes the filtered master clock signal to generate one or more respective clock signals for either the front camera or rear camera of the mobile computing device.

To reduce the interference between the master clock signal 113 and a baseband signal of a given radio transmitter/receiver, the drive strength of the master clock signal 113 may be increased and then filtered via low-pass filtering near the frequency of the baseband signal (e.g., at 700 mhz) to minimize interference with baseband signal. Thus, by increasing the drive strength of the master clock signal 113 and then applying low pass filtering to the master clock signal 113, RF noise from the master clock signal 113 may be significantly reduced and the interference between a master clock signal to a baseband signal used by the radio transmitter/receiver may be minimized.

Figure 2:
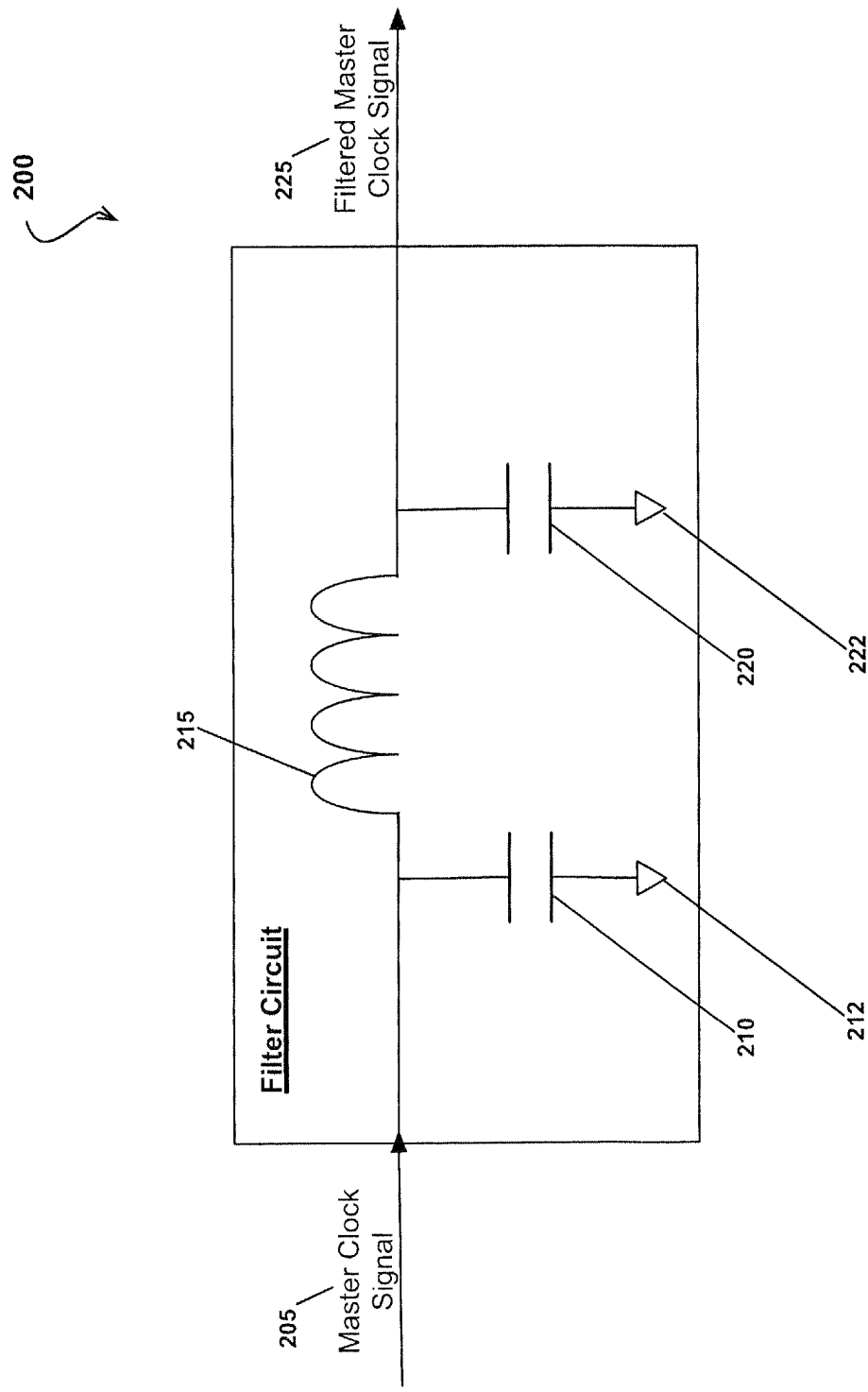
FIG. 2 conceptually illustrates an example filter circuit that can be used in accordance with some embodiments of the subject technology.

FIG. 2 conceptually illustrates an example filter circuit 200 that can be used in accordance with some embodiments of the subject technology. In some embodiments, the filter circuit 200 corresponds to the filter 115 in FIG. 1. The filter circuit 200 may be implemented as a type of low-pass filter that passes low-frequency signals and attenuates (e.g., reduces amplitude) signals with frequencies higher than a cutoff frequency.

A master clock signal 205 is passed into the filter circuit 200. As illustrated in FIG. 2, the filter circuit 200 includes a includes a filter capacitor 210, connected across an inductor 215 in series, and another filter capacitor 220, connected across a load or any circuit or component that can act as a load at an output end of the filter circuit 200. In one example, by reference to FIG. 1, the front camera clock unit 120 and rear camera clock unit 125 shown in FIG. 1 act as the load by receiving the output of the filter circuit 200. In some cases, the master clock signal 205 may include unwanted noise at higher harmonics (e.g., a component frequency of a signal that is an integer multiple of a fundamental frequency of the signal).

As illustrated, the capacitors 210 and 220 are connected, respectively, to ground 212 and 222. In some embodiments, each the capacitors utilized in the filter circuit 200 pass high frequencies more effectively than low frequencies. In this manner, each capacitor 210 and 220 may be utilized as a shunt to redirect high-frequency noise (e.g., RF noise) from the master clock signal 205 to ground. Further, lower frequencies of the master clock signal 205 will be blocked from ground and shunted to the output of the filter circuit 200. The SI unit of capacitance is the farad, which is equal to one coulomb per volt. By way of example, the capacitors 210 and 200 each have a value of 82 pF in some embodiments. The master clock signal 215 is passed to the capacitor 210 where high frequencies above a cutoff frequency are shunted to the ground 212 and low frequencies below the cutoff frequency are passed to the inductor 215. The output of the capacitor 210 is fed to the inductor 215.

The inductor 215 works in an opposite manner than the capacitors 210 and 220, and passes low-frequency signals more effectively than high-frequency signals. An inductor may be characterized by inductance that represents a value corresponding to a ratio of voltage to a rate of change of current, which has units measured in henries (H). In one example, the inductor 215 has a inductance of 100 nH. An impedance of the inductor (e.g., a measure of the opposition to a current when a voltage is applied), in some examples, is proportional with frequency in that the higher the frequency the less the inductor will conduct. Thus, high frequency noise not filtered out by the capacitor 210 will then be blocked by the inductor 215. In some examples, the inductor 215 functions similar to a gate that allows low-frequency current through but impedes high-frequency current/noise.

The output of the inductor 215 is then passed to the capacitor 220. Similar to the operation of the capacitor 210, high frequencies are shunted to the ground 222 at a cutoff frequency and low frequencies below the cutoff frequency are passed to the output of the filter circuit 200.

In some embodiments, the filter circuit may be a pi LC (inductor capacitor) low pass filter circuit. For such a filter circuit, the following set of formulas are applicable for determining different characteristics of the filter circuit:

$$L = Z_o/(pi \times F_c) \text{ henries}$$

$$C = 1/(Z_o \times pi \times Fe) \text{ farads}$$

$$F_c = 1/(pi \times \text{square root } (L \times C)) \text{ Hz}$$

where
  $Z_o$=characteristic impedance in ohms
  C=capacitance in farads
  L=inductance in henries
  $F_c$=cutoff frequency in hertz In some embodiments, the filter circuit 200 may be configured to perform low-pass filtering at a 700 MHz cutoff frequency. In some examples, typical frequencies for cellular radio communication(s) may include, but not limited to, 700 MHz, 800 MHz, 1700 MHz, 2100 MHz, 1900 MHz, and 2500 MHz. Additionally, some frequency ranges include 698-806 MHz (e.g., 3G, 4G, DVB-H, etc.), 806-824 MHz and 851-869 MHz (e.g., SMR iDEN, ESMR CDMA, ESMR LTE, etc.). Thus, by setting the cutoff frequency to 700 MHz, some embodiments of the subject technology may filter out high frequency noise (e.g., RF noise) that causes desense in radio components for cellular communication within a given mobile computing device, while also ensuring the frequencies below the cutoff frequency (e.g., pertaining to a master clock signal) are passed through the filter circuit. It should be further appreciated that other frequencies and frequency ranges may be utilized and still be within the scope of the subject technology.

As mentioned before, in some embodiments, the filter circuit 200 may be configured to perform low-pass filtering that attenuates a set of frequencies of a master clock signal above a cutoff frequency by a decibel rejection amount (e.g., a negative value such as −3.0 dB, etc.) and at a rate of frequency roll-off (e.g., 20 dB per decade or 6 dB per octave, etc.) that pushes the cutoff frequency within a threshold amount that is substantially close to a fundamental frequency of the master clock signal.

Figure 3:
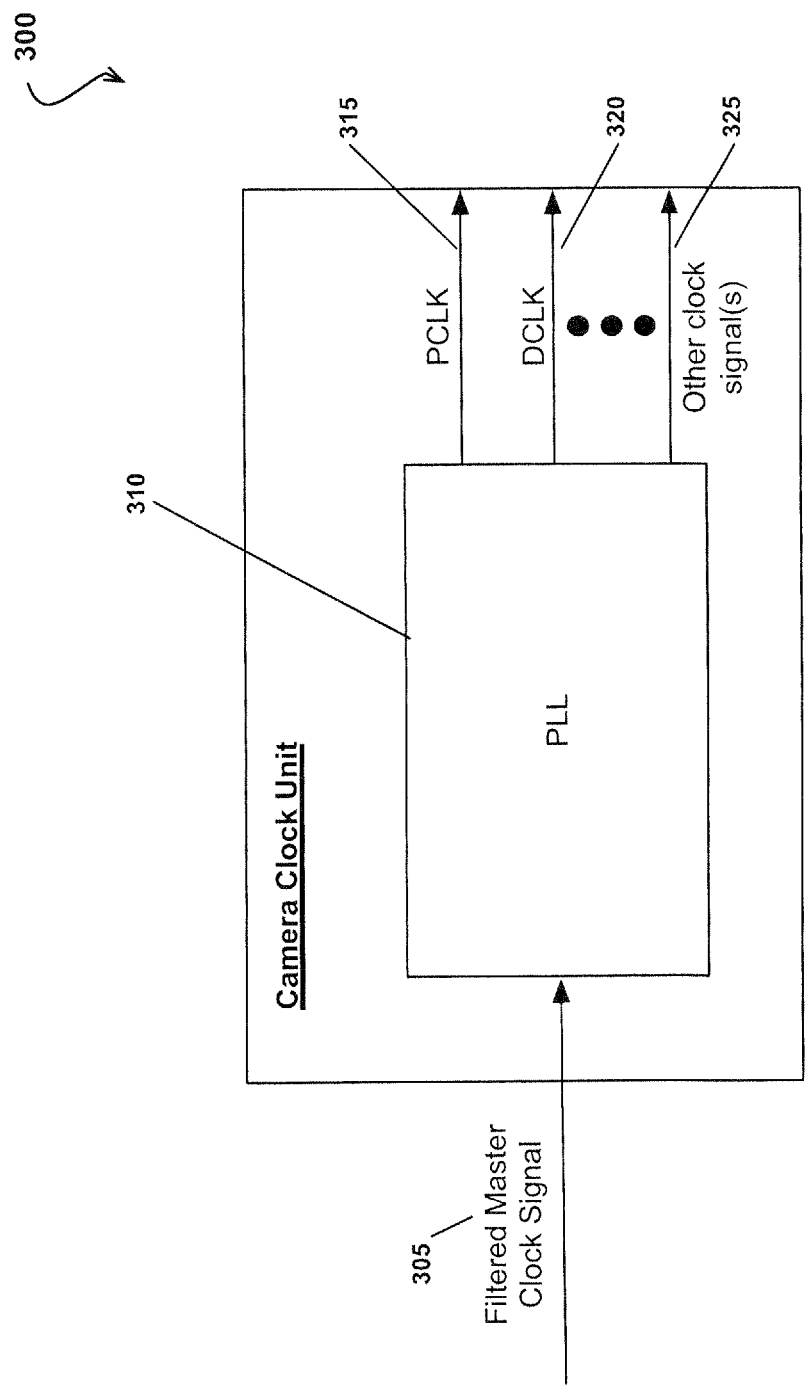
FIG. 3 conceptually illustrates an example camera clock unit including a phase-locked loop (PLL) component.

FIG. 3 conceptually illustrates an example camera clock unit 300 including a phase-locked loop (PLL) component. As shown in FIG. 3, the camera clock unit 300 includes a PLL 310 that receives a filtered master clock signal 305. In some embodiments, the filtered master clock signal 305 corresponds to the filtered master clock signal 225 by reference to FIG. 2. Further, by reference to FIG. 2, the camera clock unit 300 corresponds to the front camera clock unit 120 and/or the rear camera clock unit 125.

In some embodiments, a given clock signal for a camera of a mobile computing device may operate at high frequency (e.g., hundreds of megahertz). In this regard, a master clock signal at a lower frequency (e.g., 50 or 60 MHz) received by a camera clock unit may be required to be multiplied up to an operating frequency of a processor or similar component in the camera. In some cases, the multiplication factor may be large where the operating frequency is multiple gigahertz and the reference clock signal is tens or hundreds of megahertz.

As shown in FIG. 3, the PLL 310 receives the filtered master clock signal. The frequency of the filtered master clock signal is multiplied by the PLL 310 to increase the frequency of the filtered master clock signal to the requisite operating frequency of the camera. The output of the PLL 310 may be a pixel clock signal (PCLK) 315 and a digital clock signal (DCLK) 320. In some embodiments, the frequency of the PCLK 315 is much higher than the DCLK 320. The frequency of the PCLK 315 determines a rate in which pixels are acquired by the camera in some examples. The frequency of the DCLK 320 is lower than the PCLK 315 and is utilized for other operations by the camera (e.g., a respective image processor, analog/digital converter, various house-keeping purposes, etc.). The PCLK 315 and the DCLK 320 are outputted, via respective interfaces, to respective components of the camera. As further shown in FIG. 3, one or more other clock signal(s) 325 may be provided by the PLL 310. By way of example, such clocks signals may include, but are not limited to, a control signal, interface signal and/or digital image processing signal. It is appreciated that other types of clocks signals may be provided and still be within the scope of the subject technology.

Figure 4:
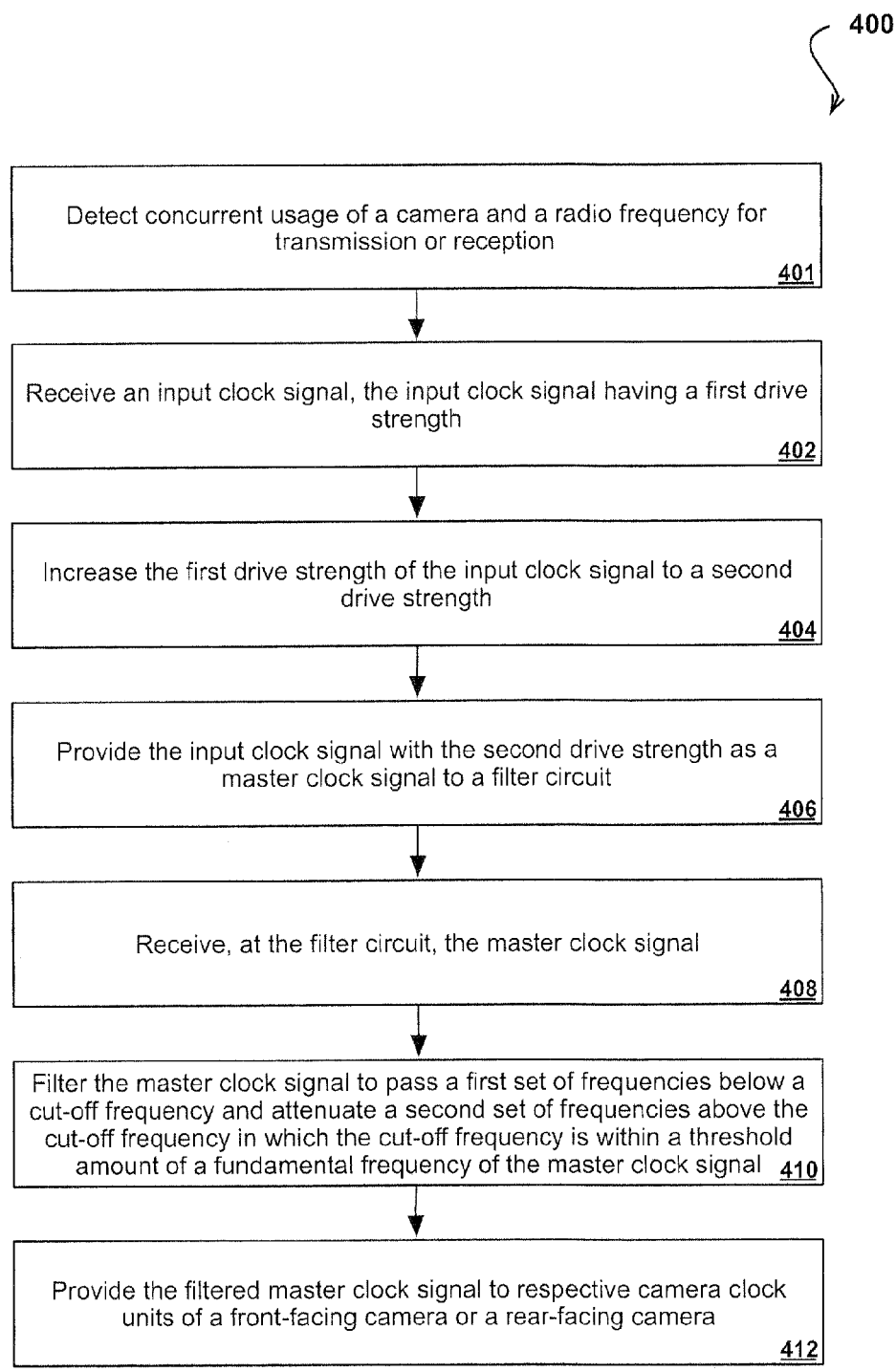
FIG. 4 illustrates steps of an example process for increasing drive strength of a clock signal and filtering the clock signal to reduce desense and noise in a mobile computing device that can be used in accordance with some embodiments of the subject technology.

FIG. 4 illustrates steps of an example process 400 for increasing drive strength of a clock signal and filtering the clock signal to reduce desense and noise in a mobile computing device that can be used in accordance with some embodiments of the subject technology. In some embodiments, the process 400 may be implemented by one or more computing devices or systems. More specifically, the process 400 may be implemented by a given mobile computing device.

In some embodiments, the process 400 may be implemented by the apparatus 100 described in FIG. 1, which may be included as part of a given computing device, such as a mobile computing device with a radio transmitter/receiver to provide cellular or wireless communications and at least one camera to capture and/or process image data.

At step 401, a concurrent usage of a camera and a radio frequency for transmission or reception is detected. In some embodiments, the process 400 may be utilized when a camera is in use concurrently with a radio frequency being received and/or transmitted. However, when the camera is not used, a master clock signal is stopped and therefore does not present any potential problems or interference to the transmission or reception of the radio frequency.

At step 402, an input clock signal is received at an application processor of a mobile computing device. In some embodiments, the input clock signal has a drive strength (e.g., 2 mA) corresponding to a value of current. The application processor, in some examples, is a processor configured to operate in a mobile computing device according to power, space and/or other requirements. The application processor, for instance, runs an operating system for the mobile computing device that provides a software environment(s) to execute different applications.

At step 404, the drive strength of the input clock signal is increased to a second drive strength. In some embodiments, the increase in the drive strength of the input clock signal is response to the detection of the concurrent usage of a camera and a radio frequency antenna for transmission or reception. In some embodiments, the input clock signal is passed through a set of transistors connected in parallel to increase the current of the drive strength of the input clock signal. At step 406, the input clock signal with the second drive strength is provided as a master clock signal to a filter circuit. At step 408, the master clock signal is received at the filter circuit.

At step 410, filtering the master clock signal to pass a first set of frequencies below a cutoff frequency and attenuating a second set of frequencies above the cutoff frequency. In some embodiments, the master clock signal is passed through a first filter capacitor. The master clock signal from the first filter capacitor is then passed to an inductor. Further, the master clock signal from the inductor is passed to a second filter capacitor. An output signal from the second filter capacitor is provided as the filtered master clock signal in some examples. In one example, the cutoff frequency is set to be approximate or within a threshold amount of a fundamental frequency of the master clock signal. For instance, in an example in which the fundamental frequency of the master clock signal is 700 MHz, the cutoff frequency may be set to be within a specified range of the fundamental frequency (e.g., 680 Mhz-720 Mhz). As used herein, the fundamental frequency refers to a lowest frequency of a periodic waveform (e.g., the master clock signal).

At step 412, the filtered master clock signal is provided to respective camera clock units of a front-facing camera and a rear-facing camera of the mobile computing device for operating the front-facing and rear-facing cameras. The process 400 then ends.

Figures 5A, 5B:
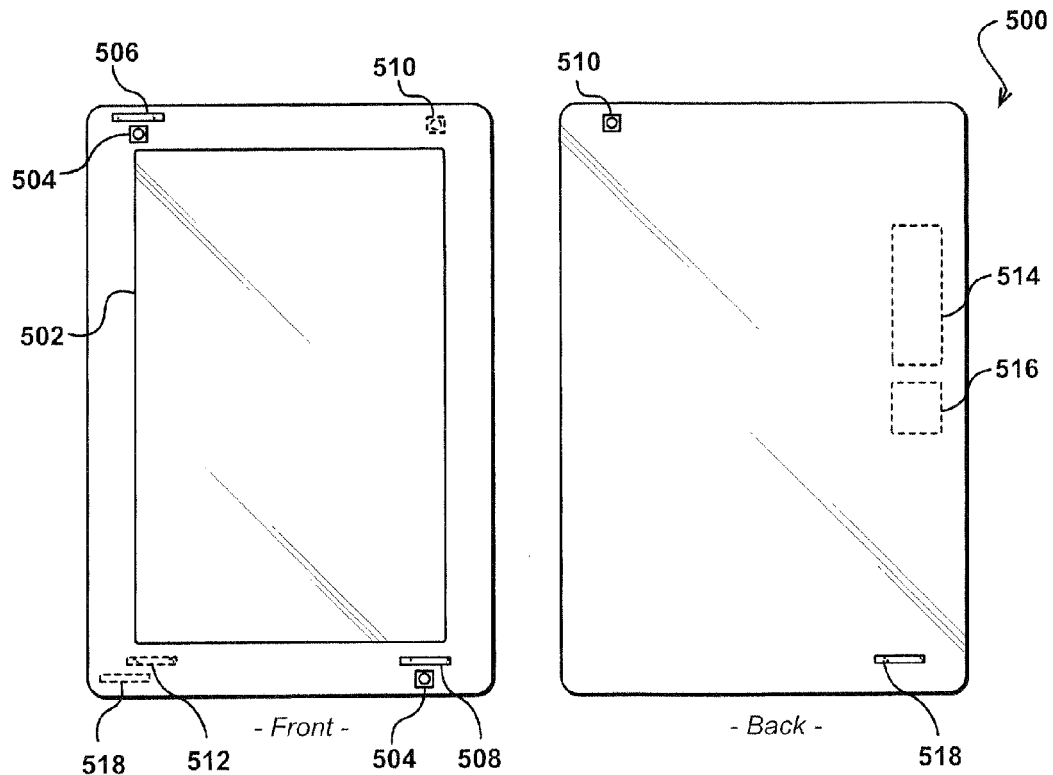
FIGS. 5A and 5B illustrate front and back views, respectively, of an example electronic computing device that can be used in accordance with various embodiments.

FIGS. 5A and 5B illustrate front and back views, respectively, of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one computing mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
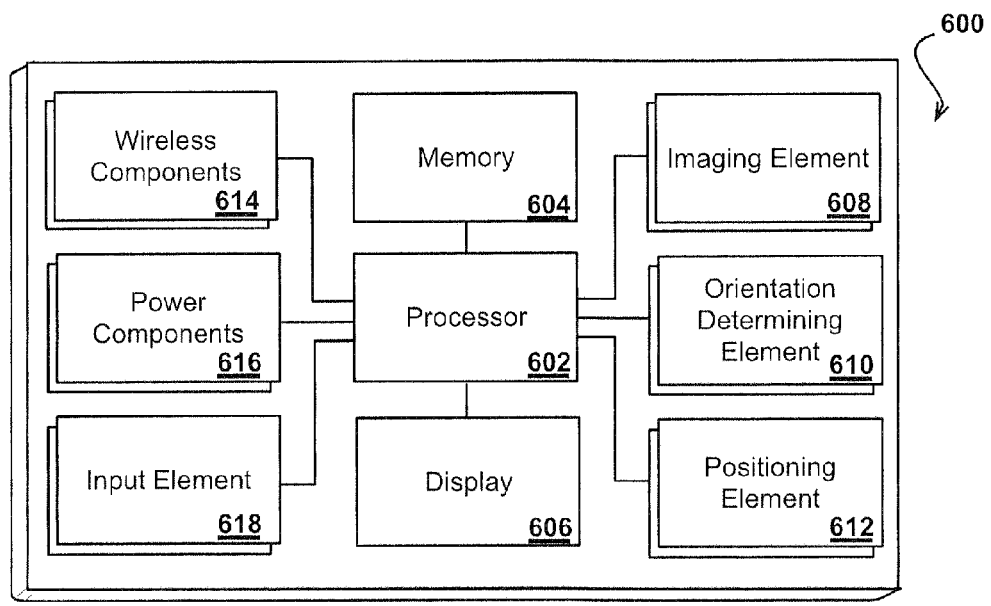
FIG. 6 illustrates a set of basic components of an electronic computing device such as the device described with respect to FIGS. 5A and 5B.

FIG. 6 illustrates a set of basic components of an electronic computing device 600 such as the device 500 described with respect to FIGS. 5A and 5B. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of computing approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 7:
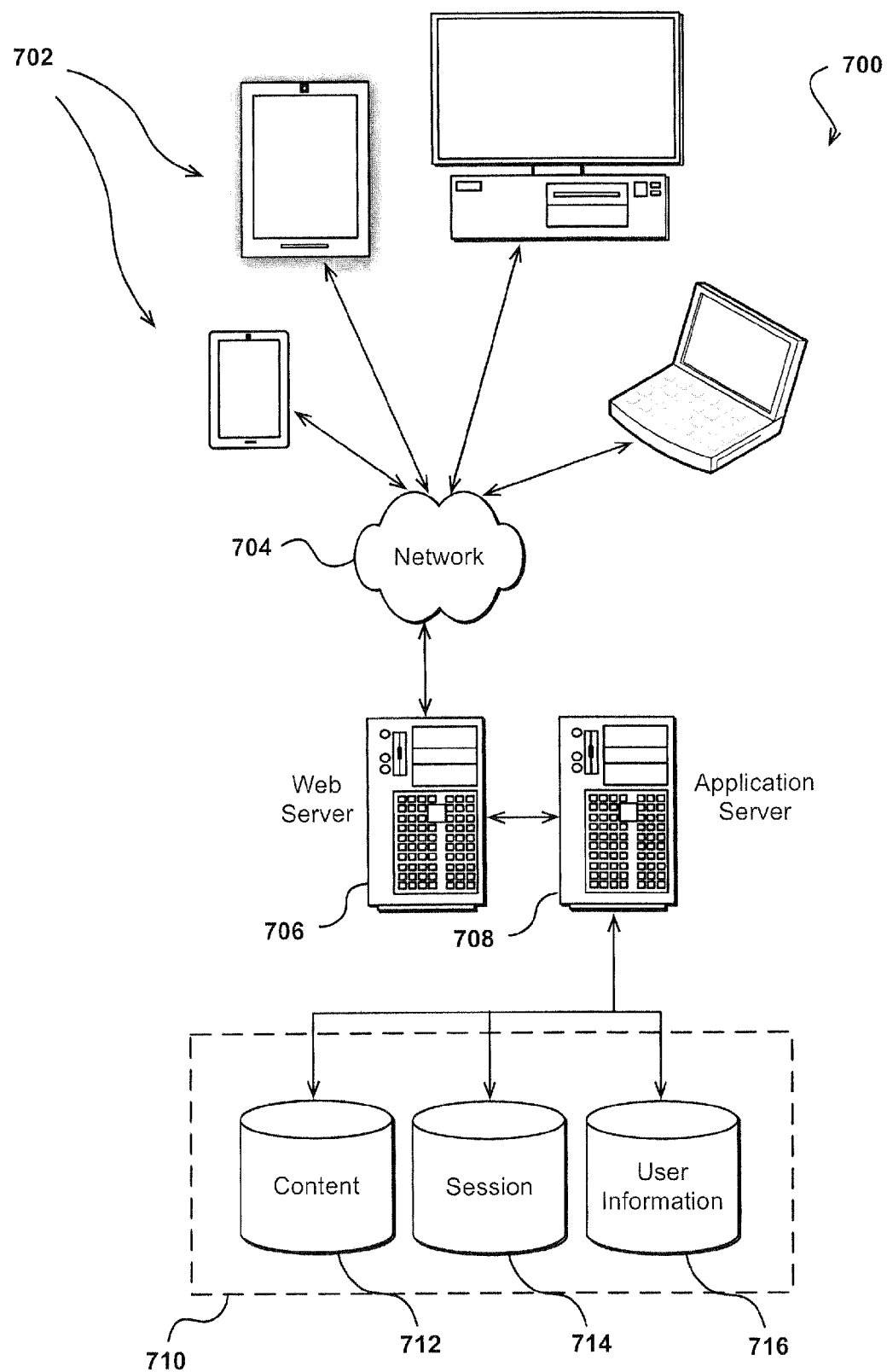
FIG. 7 illustrates an example of an environment for implementing aspects in accordance with various embodiments of the subject technology.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
receiving, at an application processor of a mobile computing device, an input clock signal, the input clock signal having a first drive strength and being associated with a camera of the mobile computing device;
detecting, by the mobile device, concurrent usage of the camera and a radio frequency antenna for transmission or reception;
responsive to detecting the concurrent usage of the camera and the radio frequency antenna, increasing the first drive strength of the input clock signal to a second drive strength;
providing the input clock signal with the second drive strength as a master clock signal to a filter circuit;
filtering the master clock signal to pass a first set of frequencies below a cutoff frequency and attenuating a second set of frequencies above the cutoff frequency, wherein the master clock signal is filtered at the cutoff frequency, wherein the cut-off frequency is substantially close to a fundamental frequency of the master clock signal; and
providing the filtered master clock signal to a camera clock unit of the camera of the mobile computing device.

2. The computer-implemented method of claim 1, wherein filtering the master clock signal to pass the first set of frequencies below the cutoff frequency and attenuating the second set of frequencies above the cutoff frequency comprises:
passing the master clock signal through a first filter capacitor;
passing the master clock signal from the first filter capacitor to an inductor;
passing the master clock signal from the inductor to a second filter capacitor; and
providing an output signal from the second filter capacitor as the filtered master clock signal.

3. The computer-implemented method of claim 1, wherein increasing the first drive strength to the second drive strength comprises increasing a current of the input clock signal from 2 mA to 8 mA.

4. The computer-implemented method of claim 1, wherein filtering the master clock signal attenuates a set of frequency signal components of the master clock signal that are above the cutoff frequency by a decibel rejection amount and at a rate of frequency roll-off that pushes the cutoff frequency substantially close to the fundamental frequency of the master clock signal.

5. A apparatus comprising:
a clock generator and drive strength control unit, the clock generator and drive strength control unit configured to increase a drive strength of a master clock signal from a first drive strength to a second drive strength in response to concurrent usage of a camera and a radio frequency component of the apparatus;
a filter circuit coupled to the clock generator and drive strength control unit, the filter circuit configured to perform low-pass frequency filtering on the master clock signal to provide a filtered master clock signal, wherein the low-pass frequency filtering filters the master clock signal at a cutoff frequency that is substantially close to a fundamental frequency of the master clock signal; and
a first camera clock unit coupled to the filter circuit and the camera, the first camera clock unit configured to receive the filtered master clock signal.

6. The apparatus of claim 5, wherein the clock generator and drive strength control unit comprises a set of transistors connected in parallel.

7. The apparatus of claim 5, wherein the filter circuit comprises:
a first filter capacitor, the first filter capacitor configured to receive the master clock signal;
an inductor coupled to the first filter capacitor in series, the inductor configured to receive the master clock signal from the first filter capacitor; and
a second filter capacitor coupled to the inductor and connected across a load at an output end of the filter circuit, the second filter capacitor configured to receive the master clock signal from the inductor and provide the filtered master clock signal to the output end of the filter circuit.

8. The apparatus of claim 7, wherein the first filter capacitor is further coupled to a ground, and further configured to re-direct a first set of frequency signal components of the master clock signal that are above the cutoff frequency to the ground and pass a second set of frequency signal components of the master clock signal that are below the cutoff frequency to the inductor.

9. The apparatus of claim 8, wherein the first camera clock unit comprises a phase-locked loop component.

10. The apparatus of claim 7, wherein the second filter capacitor is further coupled to a ground, and configured to re-direct a first set of frequency signal components of the master clock signal to the ground and pass a second set of frequency signal components of the master clock signal below the cutoff frequency to the output end of the filter circuit.

11. The apparatus of claim 5, wherein the low-pass frequency filtering attenuates a set of frequency signal components of the master clock signal above the cutoff frequency by a decibel rejection amount and at a rate of frequency roll-off that pushes the cutoff frequency within substantially close to the fundamental frequency of the master clock signal.

12. The apparatus of claim 5, further comprising:
a second camera clock unit coupled to the filter circuit, the second camera clock unit configured to receive the filtered master clock signal.

13. A non-transitory computer-readable medium including instructions stored therein that, when executed by at least one computing device, cause the at least one computing device to perform a set of operations comprising:
receiving, at an application processor of a mobile computing device, an input clock signal, the input clock signal having a first drive strength and being associated with a camera of the mobile computing device;
detecting, by the mobile device, concurrent usage of the camera and a radio frequency antenna for transmission or reception;
responsive to detecting the concurrent usage of the camera and the radio frequency antenna, increasing the first drive strength of the input clock signal to a second drive strength;
providing the input clock signal with the second drive strength as a master clock signal to a filter circuit;

filtering the master clock signal to pass a first set of frequencies below a cutoff frequency and attenuating a second set of frequencies above the cutoff frequency, wherein the master clock signal is filtered at the cutoff frequency, wherein the cut-off frequency is substantially close to a fundamental frequency of the master clock signal; and providing the filtered master clock signal to a camera clock unit of the camera of the mobile computing device.

14. The non-transitory computer-readable medium of claim 13, wherein increasing the first drive strength of the input clock signal to the second drive strength comprises:
passing the input clock signal through a set of transistors connected in parallel to increase a current of the first drive strength of the input clock signal.

15. The non-transitory computer-readable medium of claim 13, wherein filtering the master clock signal to pass the first set of frequencies below the cutoff frequency and attenuating the second set of frequencies above the cutoff frequency comprises:
passing the master clock signal through a first filter capacitor;
passing the master clock signal from the first filter capacitor to an inductor;
passing the master clock signal from the inductor to a second filter capacitor; and
providing an output signal from the second filter capacitor as the filtered master clock signal.

16. The non-transitory computer-readable medium of claim 13, wherein the camera clock unit of the camera comprises a phase-locked loop component.

17. The non-transitory computer-readable medium of claim 13, wherein increasing the first drive strength to the second drive strength comprises increasing a current of the input clock signal from 2 mA to 8 mA.

18. The non-transitory computer-readable medium of claim 13, wherein filtering the master clock signal attenuates a set of frequency signal components of the master clock signal that are above the cutoff frequency by a decibel rejection amount and at a rate of frequency roll-off that pushes the cutoff frequency substantially close to the fundamental frequency of the master clock signal.

19. The non-transitory computer-readable medium of claim 13, wherein the filter circuit comprises:
a first filter capacitor, the first filter capacitor configured to receive the master clock signal;
an inductor coupled to the first filter capacitor in series, the inductor configured to receive the master clock signal from the first filter capacitor; and
a second filter capacitor coupled to the inductor and connected across a load at an output end of the filter circuit, the second filter capacitor configured to receive the master clock signal from the inductor and provide the filtered master clock signal to the output end of the filter circuit.

20. The non-transitory computer-readable medium of claim 19, wherein the first filter capacitor is further coupled to a ground, and further configured to re-direct a first set of frequency signal components of the master clock signal that are above the cutoff frequency to the ground and pass a second set of frequency signal components of the master clock signal that are below the cutoff frequency to the inductor.

* * * * *